(12) United States Patent
Vu

(10) Patent No.: US 9,240,003 B1
(45) Date of Patent: Jan. 19, 2016

(54) SYSTEM AND METHOD FOR SUPPORTING A PRODUCT VIA A USER-BASED COMMUNITY

(75) Inventor: Miriam Vu, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 1843 days.

(21) Appl. No.: 12/242,821

(22) Filed: Sep. 30, 2008

(51) Int. Cl.
*G06Q 10/00* (2012.01)

(52) U.S. Cl.
CPC .................................... *G06Q 10/20* (2013.01)

(58) Field of Classification Search
CPC ............ G06Q 10/06311; G06Q 10/20; G06Q 30/016; G06Q 10/063112; G06Q 10/063114
USPC .......................... 705/1.1, 304, 305, 7.14, 7.15
See application file for complete search history.

(56) References Cited

U.S. PATENT DOCUMENTS

| | | | |
|---|---|---|---|
| 7,167,855 B1 * | 1/2007 | Koenig ................................. | 1/1 |
| 7,676,034 B1 * | 3/2010 | Wu et al. .................. | 379/265.01 |
| 7,676,035 B2 * | 3/2010 | Werth et al. .............. | 379/266.09 |
| 8,359,220 B2 * | 1/2013 | Boothe et al. ................. | 705/7.14 |
| 2001/0039508 A1 * | 11/2001 | Nagler et al. .................... | 705/11 |
| 2005/0060217 A1 * | 3/2005 | Douglas ......... | G06Q 10/063112 705/7.14 |
| 2006/0184381 A1 * | 8/2006 | Rice et al. ......................... | 705/1 |

* cited by examiner

*Primary Examiner* — Kira Nguyen
(74) *Attorney, Agent, or Firm* — Osha Liang LLP

(57) ABSTRACT

The invention relates to a method to provide product support. The method steps include storing mentor information received from at least one mentor to create a volunteer mentor network, where the at least one mentor volunteers to assist a plurality of users with a product, and where mentor information comprises a reported expertise with the product and availability of the at least one mentor to provide product support, tracking a status of the at least one mentor to determine current availability to provide product support, receiving user data, where user data comprises information concerning a focus of a user in the product, identifying an applicable mentor based on the volunteer mentor network and user data, and displaying the applicable mentor to the user.

31 Claims, 4 Drawing Sheets

SYSTEM AND METHOD FOR SUPPORTING A PRODUCT VIA A USER-BASED COMMUNITY

BACKGROUND

Technical support is a range of services providing assistance with technology products such as computers or software applications. In general, technical support services attempt to help the user solve specific problems encountered during the use of such computers or software applications. Technical support may be offered for free or for a fee, offered by a provider of the computer/software application or a third party fee-based service company, delivered over the telephone or via various online media such as e-mail, website, or chat window. Large organizations often provide internal technical support to staff for computer or software application related issues. The Internet is also a common source where users can obtain freely available technical support where experienced users may provide advice and assistance through forums, user communities or other website mechanisms.

SUMMARY

In general, in one aspect, the invention relates to a method to provide product support. The method steps include storing mentor information received from at least one mentor to create a volunteer mentor network, wherein the at least one mentor volunteers to assist a plurality of users with a product, and wherein mentor information comprises a reported expertise with the product and availability of at least one mentor to provide product support, tracking a status of at least one mentor to determine current availability to provide product support, receiving user data, wherein user data comprises information concerning a focus of a user in the product, identifying an applicable mentor based on the volunteer mentor network and user data, and displaying the applicable mentor to the user.

In general, in one aspect, the invention relates to a computer readable medium, embodying instructions executable by the computer to perform method steps to provide product support. The instructions include functionality to store mentor information received from at least one mentor to create a volunteer mentor network, wherein at least one mentor volunteers to assist a plurality of users with a product, and wherein mentor information comprises a reported expertise with the product and availability of at least one mentor to provide product support, track a status of the at least one mentor to determine current availability to provide product support, receive user data, wherein user data comprises information concerning a focus of a user in the product, identify an applicable mentor based on the volunteer mentor network and user data, and display the applicable mentor to the user.

In general, in one aspect, the invention relates to a system for providing product support. The system includes a computing device configured to provide user data to a server, wherein user data comprises information concerning a focus of a user in a product, and display an applicable mentor obtained from the server, the server, communicatively connected to the computing device, configured to receive user data, obtain mentor information from at least one mentor to create a volunteer mentor network, identify the applicable mentor based on the volunteer mentor network and user data, and provide the applicable mentor to the computing device, wherein at least one mentor volunteers to assist a plurality of users with the product, wherein mentor information comprises a reported expertise with the product and availability of at least one mentor to provide product support, and a data repository, operatively connected to the server, configured to store mentor information received from at least one mentor.

Other aspects of the invention will be apparent from the following description and the appended claims.

DETAILED DESCRIPTION

Figure 1:
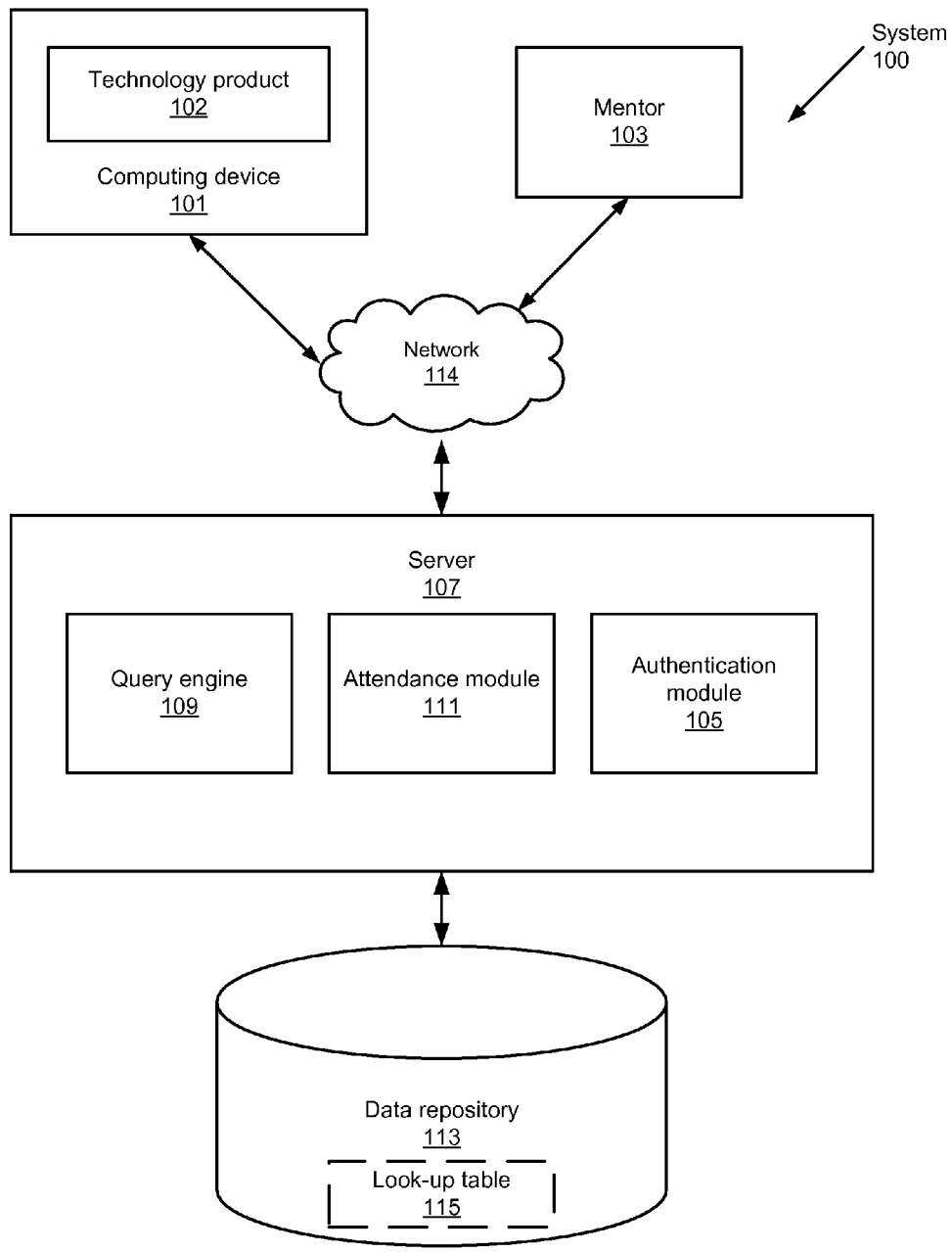
FIG. 1 depicts a schematic block diagram of a system in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to provide targeted support (or product support) for a product (or technology product, such as computers, software applications, etc.) by establishing a network of volunteer mentors who are users of the product themselves with experience across different parts of the product. In such embodiments, the system and method provide matched volunteer mentors to other users needing guidance or assistance (i.e., targeted support) at the moment of need (e.g., instantly or in real-time). In one or more embodiments of the invention, volunteer mentors are matched to other users based on predetermined matching attributes between volunteer mentors and other users as well as based on user ratings obtained after providing the targeted support.

In one or more embodiments of the invention, the technology product may be computer software in which case the provided system and method display a list of volunteer mentors matched to a user of the computer software within the computer software environment where volunteer mentors with higher ratings that are currently online appear at the top of the list. In one or more embodiments of the invention, this list may be updated when the user switches tasks by going to a different area of the computer software environment.

FIG. 1 depicts a schematic block diagram of a system (100) in accordance with one or more embodiments of the invention. In one or more embodiments of the invention, one or more of the modules shown in FIG. 1 may be omitted, repeated, and/or substituted. Accordingly, embodiments of the invention should not be considered limited to the specific arrangements of modules shown in FIG. 1. As shown in FIG. 1, the system (100) includes computing device (101), mentor (103), server (107), and data repository (113). In addition, the computing device (101), mentor (103), and server (107) are coupled via network (114). Furthermore, the computing device (101) includes technology product (102), the server (107) includes authentication module (105), query engine (109) and attendance module (111), and the repository (113)

includes look-up table (115). Although one computing device and one mentor are shown in FIG. 1, those skilled in the art will recognize that more than one computing device or mentor may be included in the system (100). Further, although the authentication module (105), query engine (109) and attendance module (111) are shown to be included in one server, those skilled in the art will recognize that multiple servers may be used. Further still, although the computing device (101), mentor (103), and server (107) are shown to be coupled via a network (114), those skilled in the art will recognize that multiple networks, point-to-point connections, or other suitable coupling configurations may also be used. Furthermore, mentor (103) may be coupled to (e.g., access) the network (114) via an interface device (not shown) and technology product (102) may be separate from the computing device (101) while coupled with the computing device (101) via software interface modules (not shown).

In one or more embodiments of the invention, the computing device (101) may be a computer, smart phone, gaming console, or other networked devices with computing capabilities. In one such embodiment, the technology product (102) may be a software application (e.g., an accounting software) or a physical device (e.g., a hardware add-on module, built-in machinery, etc.) installed on the computing device (101). In other such embodiments, the technology product (102) may also be a separate device (e.g., a remote application server, remote controlled machinery, etc.) controlled by the computing device (101). Generally speaking, a user of the technology product (102) uses the computing device (101) as a user interface device and therefore is also a user of the computing device (101). The term "user", "user of the technology product (102)", and "user of the computing device (101)" are used interchangeably in this document.

In one or more embodiments of the invention, a user (not shown) of the computing device (101) navigates within an operating environment (e.g., the aforementioned accounting software or other control environments executing on the computing device (101) for the aforementioned built-in machinery, remote application server, remote controlled machinery, etc.) associated with the technology product (102) and may encounter a need for guidance or assistance from time to time. In such embodiments, the operating environment may include multiple sections associated with different parts of the technology product (102) for various different tasks of the user, such as payroll section or invoice section of the accounting software, etc.

In one or more embodiments of the invention, volunteer mentors (e.g., mentor (103)) are themselves users of the technology product (102) that have experience/expertise in various sections of the technology product (102) and can provide the needed guidance/assistance to other users (e.g., the user of the computing device). In such embodiments, the volunteer mentors (e.g., mentor) may be professionals (e.g., an accountant) affiliated with business entities (e.g., a corporation) who have provided potentially relevant information (i.e., mentor information) that can help determine whether each of them may be an applicable mentor for other users (e.g., the user of the computing device) needing support. In one or more embodiments of the invention, the mentor information may be saved in data repository (113) in a suitable data structure (e.g., look-up table).

In one or more embodiments of the invention, mentor information may include mentor identity, reported expertise (i.e., expertise reported by the mentor with respect to particular sections or tasks in the product), availability of the mentor to provide product support, profession, position, experience level, etc. relating to the individual, as well as location, industry, business size, staffing level, etc. relating to the corporation with which the individual is affiliated. In one or more embodiments of the invention, mentor identity may be provided by a mentor as a real name or a pre-determined identifier such that the mentor may be anonymous. In one or more embodiments of the invention, stored mentor information may be used to form part of a searchable volunteer mentor network (not shown). The term "volunteer mentor network" in this document may be used to refer to any portion of an infrastructure including a group of volunteer mentors, facilities for accessing the group of volunteer mentors, representation of the group of volunteer mentors in data structures, and/or other relevant logistical information associated with the group of volunteer mentors.

In one or more embodiments of the invention, the computing device (101) is configured to provide user data (not shown) to server (107). In one or more embodiments of the invention, user data includes information concerning the focus of the user in the technology product (102) (e.g., a payroll module or a invoice module of an account software), which may change to different tasks from time to time as the user spends time on different sections of the aforementioned operating environment associated with the technology product (102). In one or more embodiments of the invention, user data may also include business information such as profession, position, experience level, etc. relating to the user, as well as location, business size, staffing level, etc. relating to the corporation with which the user is affiliated. In one or more embodiments of the invention, user data may also include user expertise level reported by the user with respect to particular sections or tasks in the product. In one or more embodiments of the invention, user data may be saved in data repository (113) as a user profile (e.g., preference profile) to aid in selecting applicable mentors for the user.

In one or more embodiments of the invention, the server (107) is communicatively connected to the computing device (101) and is configured to obtain mentor information from volunteer mentors (e.g., mentor) to create the volunteer mentor network (not shown). In one or more embodiments of the invention, the server (107) is configured to receive user data from the computing device (101) as well as to identify an applicable mentor (not shown) based on the volunteer mentor network and user data.

In one or more embodiments of the invention, the server (107) includes attendance module (111), which is configured to track status of the volunteer mentors (e.g., mentor) to determine current availability for providing product support. In one or more embodiments of the invention, the attendance module tracks availability of the volunteer mentors based on log-on status with a networked communication service (e.g., associated with the network).

In one or more embodiments of the invention, the server (107) includes query engine (109), which is configured to identify the applicable mentor based on the volunteer mentor network and user data. For example, mentor information from the aforementioned volunteer mentor network may be searched to identify one or more applicable mentors whose reported expertise sufficiently match the focus of the user indicated by the user data. In addition, the selection of the applicable mentors may be refined by further matching mentor information to the user data based on various pre-determined criteria such as comparable profession, position, experience level, etc. relating to the user and mentor, as well as location, industry, business size, staffing level, etc. relating to the corporation with which the user or mentor is affiliated.

In one or more embodiments of the invention, the query engine (109) may assign a mentor applicability rating for predicting usefulness of the applicable mentor based on matching levels determined from the selection and refining processes described above. Furthermore, the query engine (109) may update the selection of applicable mentors and assigned mentor applicability ratings as the user changes focus to a different task in the technology product (102). In one or more embodiments of the invention, the applicable mentors and assigned mentor applicability ratings are updated in real-time as the user navigates the operating environment associated with the technology product (102). In one or more embodiments of the invention, the query engine (109) may further adjust the mentor applicability rating based on historical data, for example feedback from a user received prior assistance from the mentor previously identified as an applicable mentor.

In one or more embodiments of the invention, the server (107) is configured to provide applicable mentors (not shown) to the computing device (101), which is configured to display the applicable mentors obtained from server (107). In one or more embodiments of the invention, the applicable mentors may be displayed within the operating environment of the technology product (102) on the computing device (101) in a pull-down menu, a dialog box, a pop-up window, or other suitable user interface formats. Generally speaking, displaying applicable mentors refers to displaying relevant information (e.g., mentor identity, contact information, or other information for identifying the mentor) identifying the applicable mentors for user selection. In such embodiments, the applicable mentors who are on-line (e.g., as determined by the attendance module) may be displayed more prominently (e.g., on top of the list). In addition, the displaying of the applicable mentors may be automatic, manually activated, or by user configuration. In one or more embodiments of the invention, the assigned mentor applicability ratings associated with the applicable mentors are also provided by the server (107) to the computing device (101) and displayed along with or as a highlight of the applicable mentors to aid the user in receiving the targeted support. In such embodiments, the applicable mentors may be displayed in an order based on the assigned rating.

In one or more embodiments of the invention, the user of the computing device (101) may contact one or more applicable mentor for guidance/assistance via various communication mechanisms, such as email, instant messaging, phone call, text messaging, or other suitable media provided over the network (114) or other separately available connections (not shown). In one or more embodiments of the invention, the server (107) may facilitate communication between the user and the applicable mentor, for example by providing contact information associated with the one or more applicable mentor to a user, by notifying the one or more applicable mentor of request for support from a user, by integrating the volunteer mentor network with the communication mechanisms, or by providing an interface between the volunteer mentor network with the communication mechanisms. In one embodiment, the email, instant messaging, phone call, text messaging, etc. may be directly initiated from within the operating environment associated with the technology product (102).

In one or more embodiments of the invention, the server (107) may be configured to obtain a rating of the applicable mentor by the user, which reflects a value of the applicable mentor as a resource in providing the targeted support. In one such embodiment, the rating may be stored in the data repository (113) to supplement a preference profile in user data associated with the user. In other such embodiments, the rating may be stored in the data repository (113) to supplement mentor information to be shared by other users needing guidance/assistance.

In one or more embodiments of the invention, access to the volunteer mentor network (i.e., providing user data to and receiving applicable mentors from the server) is restricted based on a pre-determined policy. In such embodiments, the restricted access may be controlled by the authentication module (105) operatively connected to the server via the network (114).

Figure 2:
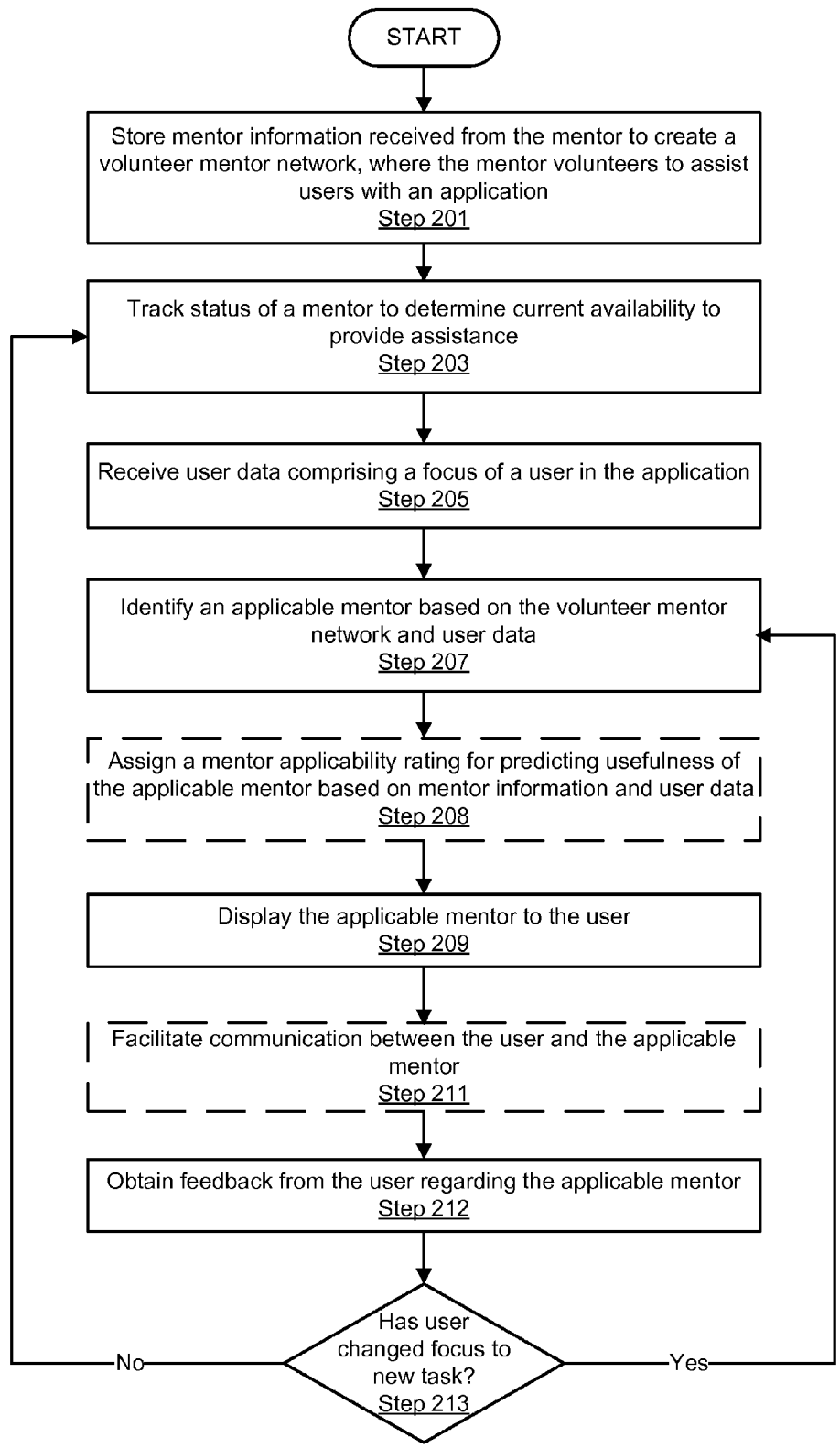
FIG. 2 depicts a flowchart of a method in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2.

The method as shown in FIG. 2 may be practiced using system (100) described with respect to FIG. 1 above. In Step 201, mentor information received from volunteer mentors (e.g., mentor) is stored (e.g., in a data repository) to create a volunteer mentor network. As described with respect to FIG. 1 above, at least a portion of the volunteer mentor network may be stored in or represented by a searchable data structure (e.g., a look-up table). In one or more embodiments of the invention, the volunteer mentors are themselves users having experience/expertise in various sections of a product (e.g., a technology product) who volunteer to assist other users of the product. In one or more embodiments of the invention, mentor information includes a reported expertise with the product and availability of the respective volunteer mentors to provide product support. Typically, the reported expertise is based on experience of the volunteer mentors with a particular task in the product. In addition, mentor information may also include business information associated with the volunteer mentors as described with respect to FIG. 1 above.

Once the volunteer mentor network is established with the mentor information, statuses of the volunteer mentors are tracked to determine current availability to provide product support (Step 203). In one or more embodiments of the invention, the status is tracked by monitoring log-on status or activities with a networked communication service (e.g. one provided over a network). In one or more embodiments of the invention, the status is tracked (e.g. by an attendance module).

In Step 205, user data may be received (e.g., by a server) concerning a focus of the user in the product. Generally speaking, the focus relates to a particular section in the product where the user is spending time on. As the user switches from task to task in using the product (e.g., by navigating the operating environment associated with the product), the focus changes accordingly. In one or more embodiments of the invention, the product may be installed on or coupled with a computing device (e.g., computing device), which acts as the user interface device to the product for the user. In such embodiments, the user focus is monitored using a computing device. In one or more embodiments of the invention, the user focus is monitored by and sent from a computing device on a regular basis (e.g., in real-time as the user performs various tasks using the product). In one or more embodiments of the invention, the user focus is interrogated (e.g., by a server) and polled based on a pre-determined scheme.

In one or more embodiments of the invention, user information may also include business information associated with the user as described with respect to FIG. 1 above. In one or more embodiments of the invention, users may be allowed to rate (e.g., to indicate value as a resource) the applicable mentors after receiving the support. The user rating may also be included in the user data of the user receiving the assistance of the applicable mentors. In one or more embodiments of the invention, portions of user data may be received in real-time (e.g., relating to user focus) while other portions of received user data (e.g., relating to business information or user rating) may be stored in a data repository as a user profile.

In Step 207, an applicable mentor is identified (e.g., by a query engine, or other means) based on the volunteer mentor network and user data. In one or more embodiments of the invention, one or more applicable mentors may be selected from the volunteer mentor network if the corresponding reported expertise relating to the current user focus exceeds a pre-determined criteria. In one or more embodiments of the invention, a mentor applicability rating may optionally be assigned to selected mentors for predicting usefulness of each of them as the applicable mentor based on mentor information and user data (Step 208). In one or more embodiments of the invention, a mentor applicability rating may also be adjusted based on historical data, for example feedback from a user who had received prior assistance from the mentor previously identified as an applicable mentor. In one or more embodiments of the invention, one or more applicable mentors may be updated (e.g., in real-time) as the user changes the focus to a different task in the product.

In Step 209, the applicable mentor is displayed to the user (e.g., by using a computing device) in various different formats as described with respect to FIG. 1 above. In one or more embodiments of the invention, multiple applicable mentors may be displayed within the operating environment associated with the product on the computing device. In one or more embodiments of the invention, multiple applicable mentors may be displayed in an order based on the assigned mentor applicability ratings where the assigned mentor applicability ratings may be displayed along with the corresponding applicable mentors or as highlights to the applicable mentors. In one or more embodiments of the invention, the applicable mentors may be displayed automatically in real-time, manually activated, or based on user configuration.

From time to time as the user needs guidance or assistance, an applicable mentor may be selected from the displayed information for the user to contact to receive support. In one or more embodiments of the invention, communication facilities are provided between the user and the applicable mentor (Step 211). For example the user may contact the applicable mentor via email, phone call, text messaging, VOIP, or other media provided over a network or other separately available connections. In one or more embodiments of the invention, these communication channels may be initiated directly from within the operating environment associated with the product.

The applicable mentor provided to the user may be contacted by the user for assistance. In Step 212, feedback may be obtained from the user regarding the applicable mentor indicating the usefulness of the applicable mentor in providing assistance. In one or more embodiments of the invention, the feedback may include a value rating of the applicable mentor as a resource. In one or more embodiments of the invention, the value rating may be stored in mentor information or user data as historical data, which may be used to generate the mentor applicability rating.

In Step 213, a determination is made as to if the user has changed focus to a new task or is spending time on a different part of the product. If the user has not changed the focus, the availability status of the volunteer mentors continues to be tracked for updating the applicable mentor selections (Step 203). If the user has changed the focus, then the method proceeds to Step 207 to identify applicable mentors according to the new focus. In one or more embodiments of the invention, the iterative loops to Step 203 and/or Step 207 may be based on pre-determined schemes. For example, these iterative loops may be initiated by the computing device based on a push scheme, by the server based on a polling scheme, based on a combination of push/polling schemes, or based on other appropriate schemes.

In one or more embodiments of the invention, user access to the volunteer mentor network may be based on a pre-determined policy and managed accordingly (e.g., restricted using a authentication module).

Figure 3:
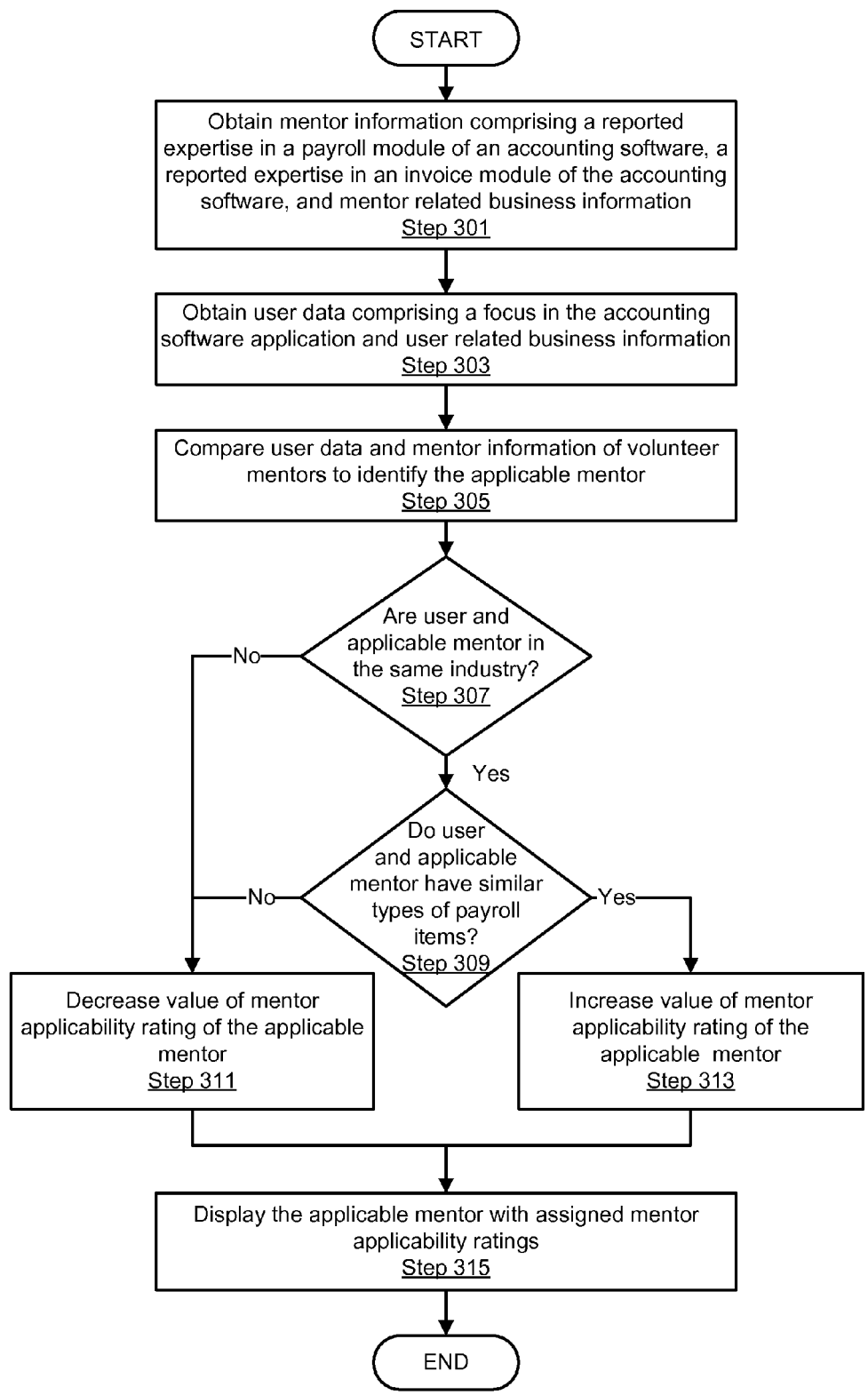
FIG. 3 depicts a flowchart of an application example in accordance with one or more embodiments of the invention.

FIG. 3 depicts a flowchart of an application example in accordance with one or more embodiments of the invention. This exemplary application may be practiced using the system (100) of FIG. 1 and based on the method described with respect to FIG. 2 above. The user and technology product depicted in FIG. 3 may be a professional using an accounting software, which has a payroll module and an invoice module. In this example, computing device coupled to the network may be a computer workstation connected to the Internet. Initially, mentor information may be obtained including a reported expertise of the mentor in the payroll module and a separate reported expertise of the mentor in the invoice module (Step 301). Additional mentor information may also be obtained in regards to business information related to the mentor.

In Step 303, in parallel to obtaining mentor information, user data may also be obtained relating to a focus in the accounting software that the user is working on. In addition, business information related to the user may also be included in the user data to aid the selection for an applicable mentor to provide support to the user. In Step 305, user data and mentor information are compared to identify applicable mentors. For example, if the user is involved in a task related to payroll liabilities, volunteer mentors may be selected primarily from those having high reported expertise in the payroll module and secondly in the same industry, nearby location (e.g., ideally city, if not then state), and working for a company having a similar staff/payroll size, using similar electronic services (e.g., eFile, ePay, etc.), having similar types of payroll items (e.g., health insurance, retirement benefits, etc.), having similar tax situations (e.g., tax deposit time table), etc. Later on, if the user changes the task to creating an invoice, volunteer mentors may be selected primarily from those having high reported expertise in the invoice module and secondly by the industry characteristics, such as inventory tracking practice, etc. Determinations such as these are performed in Step 307 and Step 309. The value of the mentor applicability rating (i.e., the assigned mentor applicability rating) of the applicable mentor is adjusted accordingly in Step 311 and Step 313.

Following the steps described above to identify and rate the applicable mentors, there may be an area in the accounting application that will always display a list of volunteer mentors that are the best match for the user at the time (i.e., applicable mentors) (Step 315). Volunteer mentors with higher assigned mentor applicability ratings that are currently online will appear at the top of the list. The online status of these volunteer mentors may be detected by use of an online application service or networked communication services (e.g., instant messaging or phone call over Internet). The user has the option of minimizing the list to un-clutter the display and/or if there is no need for guidance or assistance. The user can contact an applicable mentor by sending an instant message or by Internet calling. Subsequent to receiving the support, the user can rate the quality of the support from the particular mentor. With this volunteer mentor network readily available to answer any questions, users can proceed with more confidence, whether they are new to the accounting application or new to a particular feature of the accounting software. Consequently, new users will be less likely to abandon the accounting application and users in general can learn to take advantage of more areas of the accounting software thereby deriving greater value from it.

Figure 4:
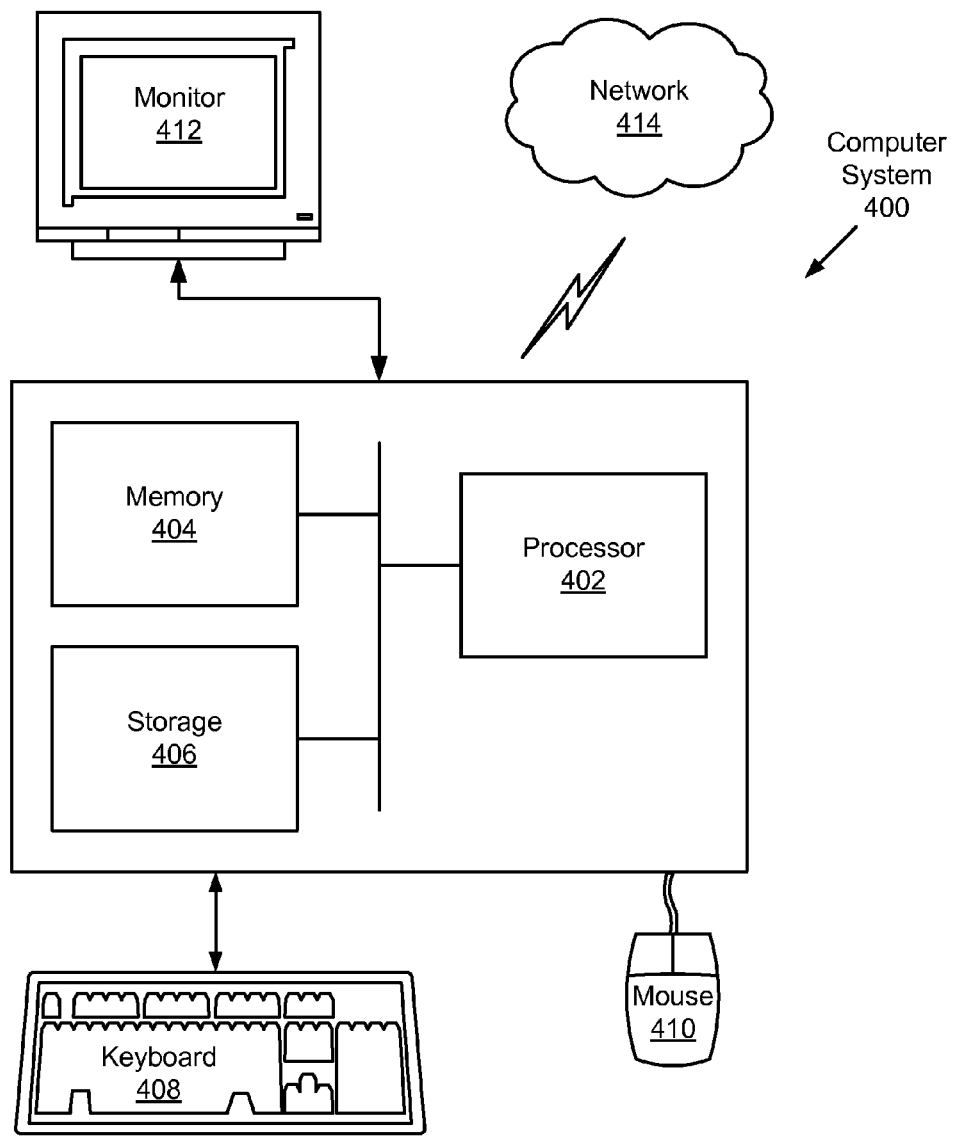
FIG. 4 depicts a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., computing device, mentor, authentication module, attendance module, query engine, data repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to provide online product support, comprising:

receiving mentor information from a first user of a product via an interface device in response to the first user volunteering to assist a plurality of users with the product, wherein mentor information comprises a reported expertise of the first user with the product and a first profession of the first user, wherein the first user volunteers to provide online product support;

tracking, by a processor, a status of the first user to determine current online availability of the first user to provide product support to the plurality of users;

detecting, in real time, that a second user of the plurality of users is currently using a module of the product, wherein the module is identified without user intervention from a computing device of the second user by real time monitoring an activity of the second user using the computing device as a user interface to access the module of the product;

obtaining, by the processor, user data comprising information identifying the module of the product currently used by the second user;

selecting the first user as an applicable mentor by comparing, by the processor and in response to determining that the first user is currently available to provide online product support, mentor information and user data to determine a first match between the reported expertise of the first user and the module of the product currently used by the second user;

using the computing device, within a pre-determined time period from detecting that the second user is currently using the module of the product and prior to any request from the second user, and in response to the first match, displaying to the second user applicable mentor information via the computing device identifying at least the first user, wherein the applicable mentor information is displayed using a display field generated by the product, wherein the applicable mentor information is displayed prior to the second user switching to using a different module of the product; and selecting, in response to displaying the applicable mentor information and an indication from the second user entered via the computing device that the second user needs assistance, the first user as a mentor by further comparing mentor information and user data to determine a second match between the first profession of the first user and the second profession of the second user.

2. The method of claim 1, wherein the reported expertise is based on experience of the first user with a particular task in the product.

3. The method of claim 1, further comprising:

updating the displayed information from identifying the first user to identifying a third user as the second user changes to using a different module of the product matching another mentor information received from the third user.

4. The method of claim 1, further comprising:

facilitating communication for the second user to receive online product support from the first user.

5. The method of claim 1, wherein mentor information further comprises data concerning business information associated with the first user.

6. The method of claim 1, wherein user data further comprises data concerning business information associated with the second user.

7. The method of claim 1, further comprising:

assigning a mentor applicability rating for predicting usefulness of the first user to provide online product support, wherein the mentor applicability rating is based on mentor information and user data; and displaying the mentor applicability rating to the second user.

8. The method of claim 1, further comprising:
obtaining feedback from the second user in response to the second user receiving product support from the first user, wherein the feedback comprises a value rating of the first user as a resource.

9. The method of claim 8, further comprising:
storing the value rating of the first user as part of at least one selected from a group consisting of user data associated with the second user and mentor information associated with the first user.

10. The method of claim 1, further comprising:
establishing a policy to restrict access to the first user by the second user to receive online product support.

11. A non-transitory computer readable medium, embodying instructions executable by a computer to perform method steps to provide online product support, the instructions comprising functionality to:
receive mentor information from a first user of a product via an interface device in response to the first user volunteering to assist a plurality of users with the product and a first profession of the first user,
wherein mentor information comprises a reported expertise of the first user with the product, wherein the first user volunteers to provide online product support; track a status of the first user to determine current online availability of the first user to provide online product support;
detect, in real time, that a second user of the plurality of users is currently using a module of the product, wherein the module is identified without user intervention from a computing device of the second user by real time monitoring an activity of the second user using the computing device as a user interface to access the module of the product;
obtain user data comprising information identifying the module of the product currently used by the second user and a second profession of the second user;
select the first user as an applicable mentor by comparing, in response to determining that the first user is currently available to provide online product support, mentor information and user data to determine a first match between the reported expertise of the first user and the module of the product currently used by the second user;
using the computing device, within a pre-determined time period from detecting that the second user is currently using the module of the product and prior to any request from the second user, and in response to the first match, display to the second user applicable mentor information via the computing device identifying at least the first user, wherein the applicable mentor information is displayed using a display field generated by the product, wherein the applicable mentor information is displayed prior to the second user switching to using a different module of the product; and
select, in response to displaying the applicable mentor information and an indication from the second user entered via the computing device that the second user needs assistance, the first user as a mentor by further comparing mentor information and user data to determine a second match between the first profession of the first user and the second profession of the second user.

12. The non-transitory computer readable medium of claim 11, wherein the reported expertise is based on experience of the first user with a particular task in the product.

13. The non-transitory computer readable medium of claim 11, the instructions comprising further functionality to:
update the displayed information from identifying the first user to identifying a third user as the second user changes to using a different module of the product matching another mentor information received from the third user.

14. The non-transitory computer readable medium of claim 11, the instructions comprising further functionality to:
facilitate communication for the second user to receive online product support from the first user.

15. The non-transitory computer readable medium of claim 11, the instructions comprising further functionality to:
assign a mentor applicability rating for predicting usefulness of the first user to provide online product support, wherein the mentor applicability rating is based on mentor information and user data; and
display the mentor applicability rating to the second user.

16. The non-transitory computer readable medium of claim 11, the instructions comprising further functionality to:
obtain feedback from the second user in response to the second user receiving online product support from the first user, wherein the feedback comprises a value rating of the first user as a resource.

17. The non-transitory computer readable medium of claim 16, the instructions comprising further functionality to:
store the value rating of the first user as part of at least one selected from a group consisting of user data associated with the second user and mentor information associated with the first user.

18. A system for providing online product support, comprising:
a server executing a processor, wherein the server is configured to:
receive mentor information from a first user of a product via an interface device in response to the first user volunteering to assist a plurality of users with the product, wherein mentor information comprises a reported expertise of the first user with the product and a first profession of the first user, wherein the first user volunteers to provide online product support;
track a status of the first user to determine current online availability of the first user to provide online product support;
detect, in real time, that a second user of the plurality of users is currently using a module of the product, wherein the module is identified without user intervention from a computing device of the second user by real time monitoring an activity of the second user using the computing device as a user interface to access the module of the product;
obtain user data comprising information identifying the module of the product currently used by the second user and a second profession of the second user;
select the first user as an applicable mentor by comparing, in response to determining that the first user is currently available to provide online product support, mentor information and user data to determine a first match between the reported expertise of the first user and the module of the product currently used by the second user;
provide to the computing device, within a pre-determined time period from detecting that the second user is currently using the module of the product and prior to any request from the second user, and in response to the first match, applicable mentor information identifying at least the first user; and
select, in response to providing the applicable mentor information and an indication from the second user entered via the computing device that the second user needs assistance, the first user as a mentor by further comparing mentor information and user data to determine a second match between the first profession of the first user and the second profession of the second user;

the interface device, comprising an input device and output device and communicatively connected to the server;

the computing device, comprising an input device and output device and communicatively connected to the server, configured to:
- identify, without user intervention, the module by monitoring an activity of the second user using the computing device as a user interface to access the module of the product; and
- display, prior to any request from the second user, to the second user the applicable mentor information via the computing device, wherein the applicable mentor information is displayed using a display field generated by the product, wherein the applicable mentor information is displayed prior to the second user switching to using a different module of the product; and a data repository, operatively connected to the server, configured to:
- store mentor information received from the first user.

19. The system of claim 18, wherein the reported expertise is based on experience of the first user with a particular task in the product.

20. The system of claim 18, wherein the server is further configured to:
facilitate communication for the second user to receive online product support from the first user.

21. The system of claim 18, wherein mentor information further comprises data concerning business information associated with the first user.

22. The system of claim 18, wherein user data further comprises data concerning business information associated with the second user.

23. The system of claim 18, wherein the data repository is further configured to:
store user data associated with the second user.

24. The system of claim 18, further comprising:
an authentication module operatively connected to the server configured to restrict access to the first user by the second user to receive online product support.

25. The system of claim 18, wherein the server comprises:
an attendance module configured to track the status of the first user to determine current availability of the first user to provide online product support; and
a query engine configured to search mentor information stored in the data repository based on user data.

26. The system of claim 25, wherein the query engine is further configured to:
update the information from identifying the first user to identifying a third user as the second user changes to using a different module of the product matching another mentor information received from the third user.

27. The system of claim 25, wherein the query engine is further configured to:
assign a mentor applicability rating for predicting usefulness of the first user to provide online product support, wherein the mentor applicability rating is based on mentor information and user data.

28. The system of claim 27, wherein the computing device is further configured to:
display the mentor applicability rating to the second user.

29. The system of claim 25, wherein the query engine is further configured to:
obtain feedback from the second user in response to the second user receiving online product support from the first user, wherein the feedback comprises a value rating of the first user as a resource.

30. The system of claim 29, wherein the data repository is further configured to:
store the value rating of the first user as part of at least one selected from a group consisting of user data associated with the second user and mentor information associated with the first user.

31. The system of claim 18, wherein the attendance module tracks availability of the first user based on a log-on status with a networked communication service.

* * * * *

UNITED STATES PATENT AND TRADEMARK OFFICE
CERTIFICATE OF CORRECTION

PATENT NO. : 9,240,003 B1  
APPLICATION NO. : 12/242821  
DATED : January 19, 2016  
INVENTOR(S) : Miriam Nga-Shun Vu Page 1 of 1

It is certified that error appears in the above-identified patent and that said Letters Patent is hereby corrected as shown below:

In the Claims

At column 11, claim number 8, line number 3, "...second user receiving product support from the first user...," should read --...second user receiving <u>online</u> product support from the first user,...--.

Signed and Sealed this
Twenty-fourth Day of May, 2016

Michelle K. Lee
*Director of the United States Patent and Trademark Office*